US008136971B2

(12) United States Patent
Hartman (10) Patent No.: US 8,136,971 B2
(45) Date of Patent: Mar. 20, 2012

(54) VEHICULAR LIGHT ASSEMBLY AND ASSOCIATED METHOD FOR REPAIRING THE SAME

(76) Inventor: David C. Hartman, Howard City, MI (US)

( * ) Notice: Subject to any disclaimer, the term of this patent is extended or adjusted under 35 U.S.C. 154(b) by 118 days.

(21) Appl. No.: 11/985,719

(22) Filed: Nov. 16, 2007

(65) Prior Publication Data

US 2008/0273346 A1 Nov. 6, 2008

Related U.S. Application Data

(60) Provisional application No. 60/859,573, filed on Nov. 16, 2006, provisional application No. 60/878,480, filed on Jan. 3, 2007.

(51) Int. Cl.
*F21V 33/00* (2006.01)

(52) U.S. Cl. .......................... 362/507; 362/362; 362/546

(58) Field of Classification Search .................. 362/507, 362/519, 362, 465, 546
See application file for complete search history.

(56) References Cited

U.S. PATENT DOCUMENTS

| | | | | |
|---|---|---|---|---|
| 2,587,374 A * | 2/1952 | Patton | ........................... | 362/507 |
| 4,875,956 A * | 10/1989 | Brackett | ......................... | 156/84 |
| 6,059,432 A * | 5/2000 | Nagayama | .................... | 362/507 |
| 6,398,396 B1 * | 6/2002 | Nestell et al. | ................. | 362/520 |
| 6,988,305 B1 * | 1/2006 | Wilson | .......................... | 29/527.1 |
| 6,998,174 B2 * | 2/2006 | Porter et al. | ............... | 428/318.8 |
| 7,637,644 B2 * | 12/2009 | Yamamoto | .................... | 362/546 |
| 2004/0095779 A1 * | 5/2004 | Schottland et al. | ........... | 362/510 |

* cited by examiner

*Primary Examiner* — John A Ward
(74) *Attorney, Agent, or Firm* — King & Partners, PLC

(57) ABSTRACT

A vehicular light assembly, comprising: a housing and a lens cover, wherein at least one of the housing and lens cover includes at least one previously damaged sub-component which has been repaired utilizing a mold from a vehicular light assembly and/or assembly sub-component void of damage relative to the repaired sub-component.

8 Claims, 8 Drawing Sheets

Figure 1 — Damaged Component

Figure 3

Damaged Component

Figure 4

Two Piece Mold With Fill Port

Figure 3

Two Piece Mold With Fill Port

Figure 7

Generation of New Component with Mold Being Filled with a Conventional Resin

Figure 8

VEHICULAR LIGHT ASSEMBLY AND ASSOCIATED METHOD FOR REPAIRING THE SAME

CROSS REFERENCES TO RELATED APPLICATION(S)

This application claims the benefit of U.S. Provisional Application Ser. No. 60/859,573, filed Nov. 16, 2006, entitled "VEHICULAR LIGHT ASSEMBLY AND ASSOCIATED METHOD FOR REPAIRING THE SAME" and U.S. Provisional Application Ser. No. 60/878,480 filed Jan. 3, 2007, entitled "VEHICULAR LIGHT ASSEMBLY AND ASSOCIATED METHOD FOR REPAIRING THE SAME," which are hereby incorporated herein by reference in their entirety, including all references cited therein.

BACKGROUND OF THE INVENTION

1. Field of the Invention

The present invention relates in general to a vehicular light assembly, and more particularly, to a vehicular light assembly, such as a headlight and/or taillight assembly, which includes at least one previously damaged sub-component which has been repaired utilizing a mold from a vehicular light assembly void of damage relative to the repaired sub-component.

2. Background Art

Vehicular light assemblies have been known in the art for several years. In particular, headlight and/or taillight assemblies have been utilized on automobiles and/or trucks for well over a century. While vehicular light assemblies have been known in the art, issues associated with longevity remain largely problematic. For example, securement/alignment sub-components (e.g. tabs, slots, etcetera) frequently become damaged after exposure to extreme climate variations and/or minor collisions. Heretofore, once a vehicular light assembly was damaged, the only known option, to the best of Applicant's knowledge, was to replace the same with a new vehicular light assembly, which can be extremely expensive—especially considering the fragile nature of the same. It is therefore, an object of the present invention, to provide a vehicle owner at least one option (i.e. repair) other than purchasing a completely new light assembly should the same become damaged.

SUMMARY OF THE INVENTION

The present invention is directed to one or more vehicular light assemblies as provided herein having at least one of the disclosed structural, functional, and/or ornamental characteristics.

The present invention is also directed to a vehicular light assembly, comprising: (a) a housing; and (b) a lens cover, wherein the housing and/or lens cover includes one or more previously damaged sub-component(s) which have been repaired utilizing a mold from a vehicular light assembly and/or assembly sub-component void of damage relative to the repaired sub-component(s).

In a preferred embodiment of the present invention, the vehicular light assembly includes a reflector and/or a bulb.

In another preferred embodiment of the present invention, the repaired sub-component includes a securement member, and/or an alignment member. In this embodiment the member may include, for example, a tab, a slot, a prong, a detent, and/or combinations thereof.

Preferably the lens cover is at least partially coated with a protectant, such as cured UVHC-3000.

In another aspect of the invention, the lens cover is at least partially coated with a UV-cured protectant having been thermally flashed between approximately 150 and approximately 175 degrees Fahrenheit prior to exposure to a UV-curing source.

The present invention is also directed to a method for repairing a vehicular light assembly, comprising the steps of: (a) providing a vehicular light assembly having at least one damaged sub-component; (b) providing a mold from at least one of a vehicular light assembly and vehicular light assembly sub-component void of damage relative to the at least one damaged sub-component; and (c) generating a new sub-component from the mold to, in turn, repair the at least one damaged sub-component.

In a preferred embodiment of the present invention, the method includes one or more of the following steps: (a) the step of cleaning the vehicular light assembly; (b) the step of sanding a lens cover of the vehicular light assembly; (c) the step of buffing a lens cover of the vehicular light assembly; and/or (d) the step of annealing the vehicular light assembly.

In yet another aspect of the present invention a step of curing the lens cover of the vehicular light assembly is provided which may include the step of curing the cover of a fully fabricated vehicular light assembly having a housing, a reflector, a bulb, and/or a lens cover.

BRIEF DESCRIPTION OF THE DRAWINGS

The invention will now be described with reference to the drawings wherein.

DESCRIPTION OF THE DRAWINGS

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

In accordance with the present invention a vehicular light assembly is provided which comprises a housing, a lens cover and optionally a reflector and/or bulb, wherein at least one of the housing and lens cover includes at least one previously damaged sub-component which has been repaired utilizing a mold from a vehicular light assembly and/or assembly sub-component void of damage relative to the repaired sub-component. Such a sub-component may include, for example, a securement member, an alignment member, and/or combinations thereof—including, but not limited to, a tab, a slot, a prong, a detent, and/or combinations thereof.

It will be further understood that the lens cover may be at least partially coated with a protectant, such as, for example, UVHC-3000, which is commercially available from GE Silicones. Preferably, the lens cover is at least partially coated with a UV-cured protectant having been thermally flashed between approximately 150 and 175 degrees Fahrenheit prior to exposure to a UV-curing source.

Figure 1:
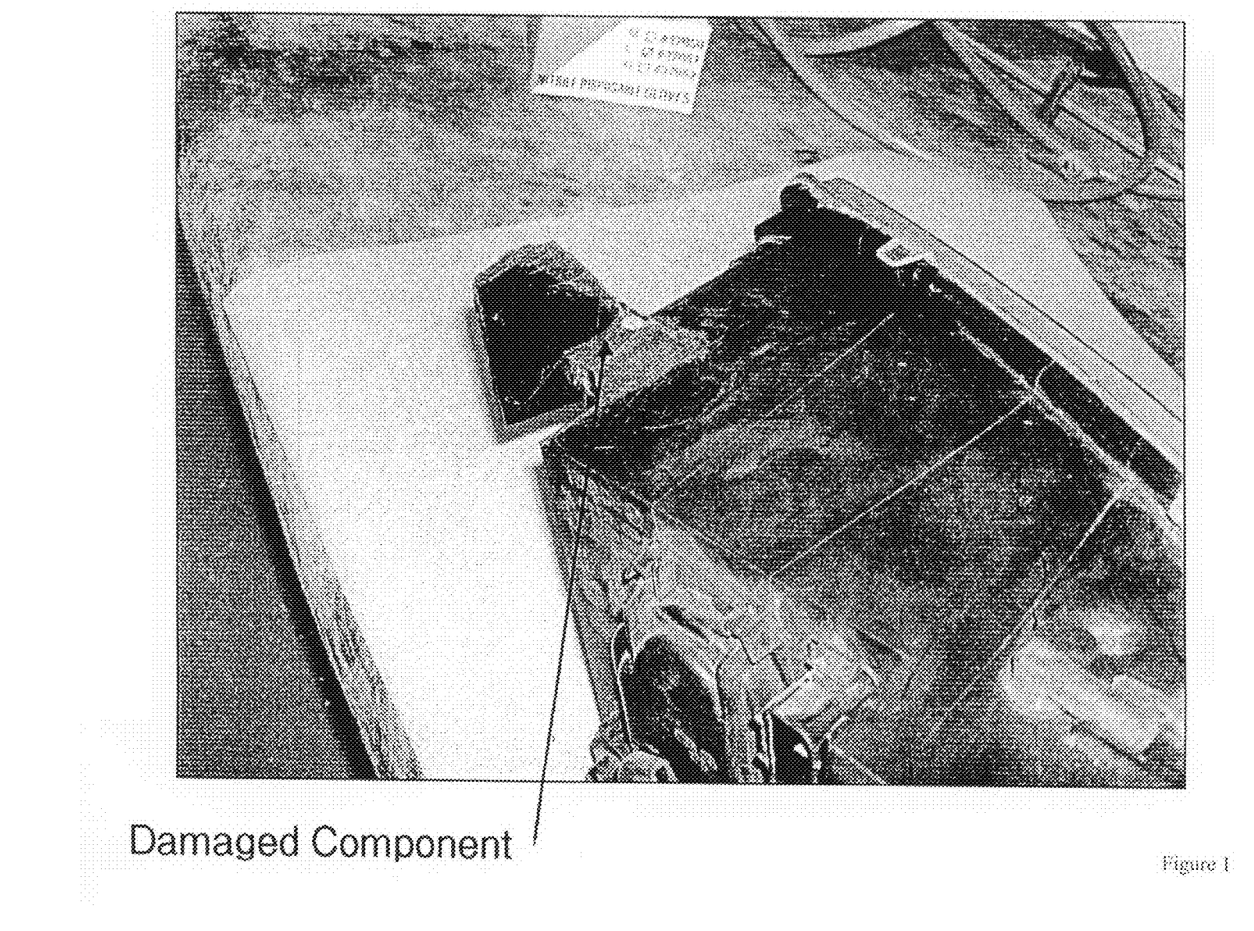
FIG. 1 is a perspective representation of a damaged vehicular light assembly in accordance with the present invention.
Figure 2:
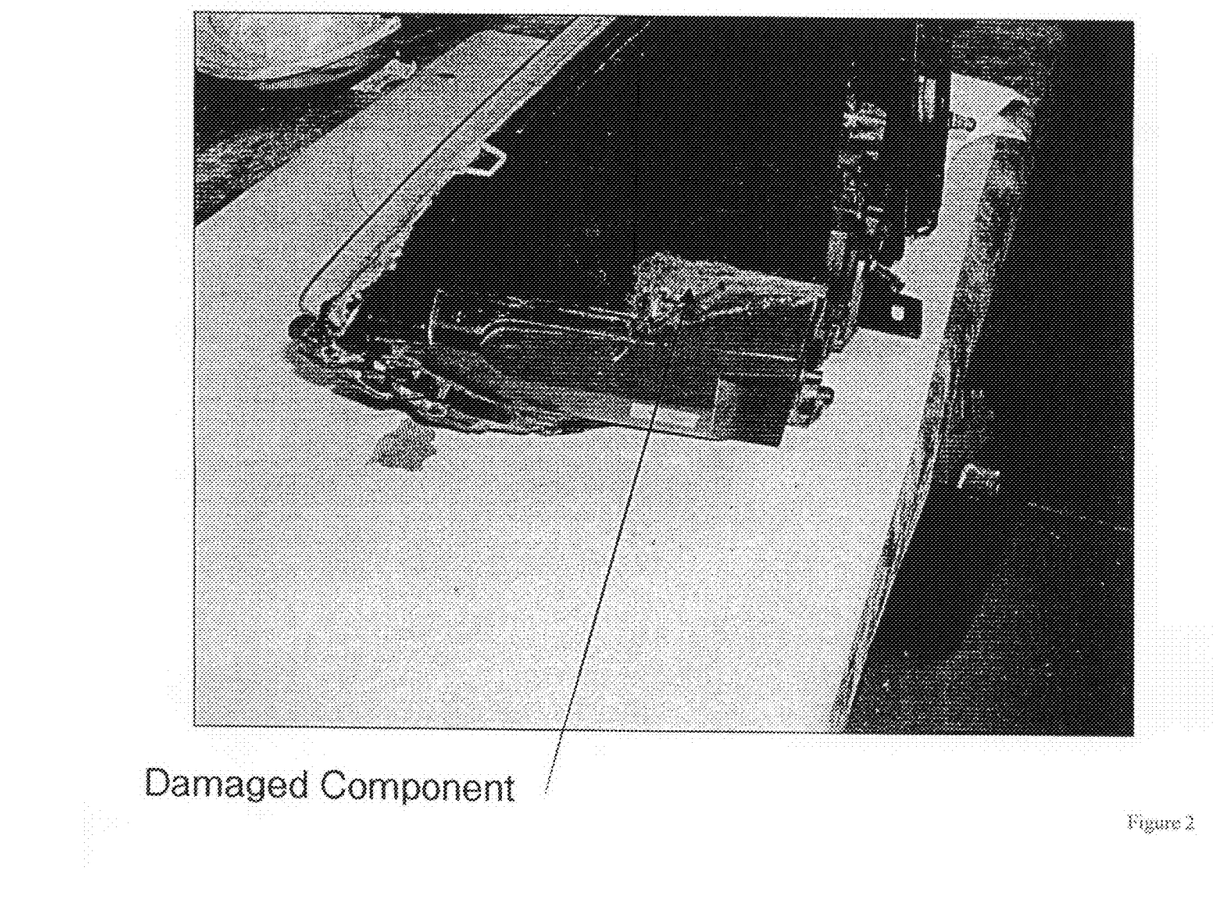
FIG. 2 is a perspective representation of a damaged vehicular light assembly in accordance with the present invention.
Figure 3:
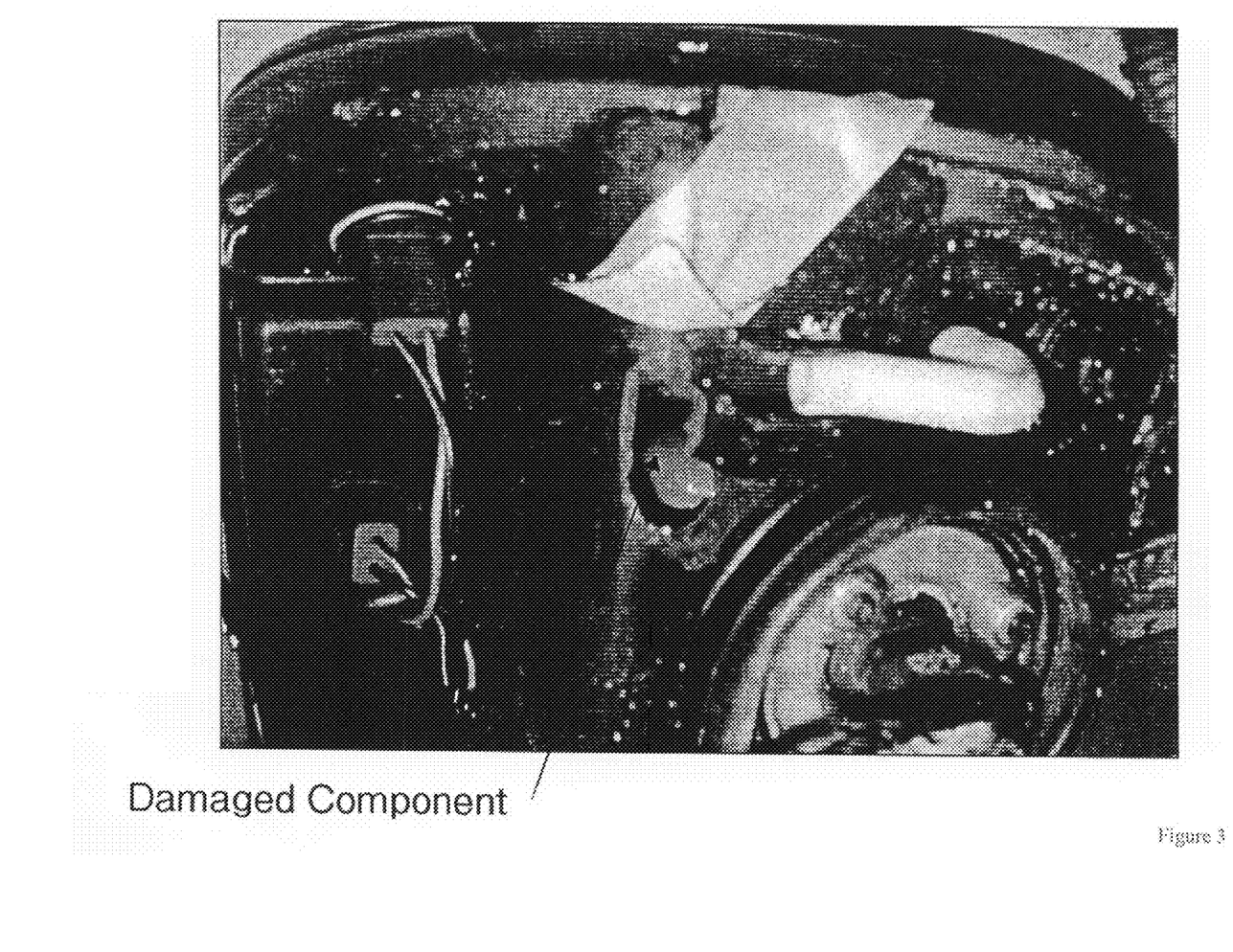
FIG. 3 is a perspective representation of a damaged vehicular light assembly in accordance with the present invention.
Figure 4:
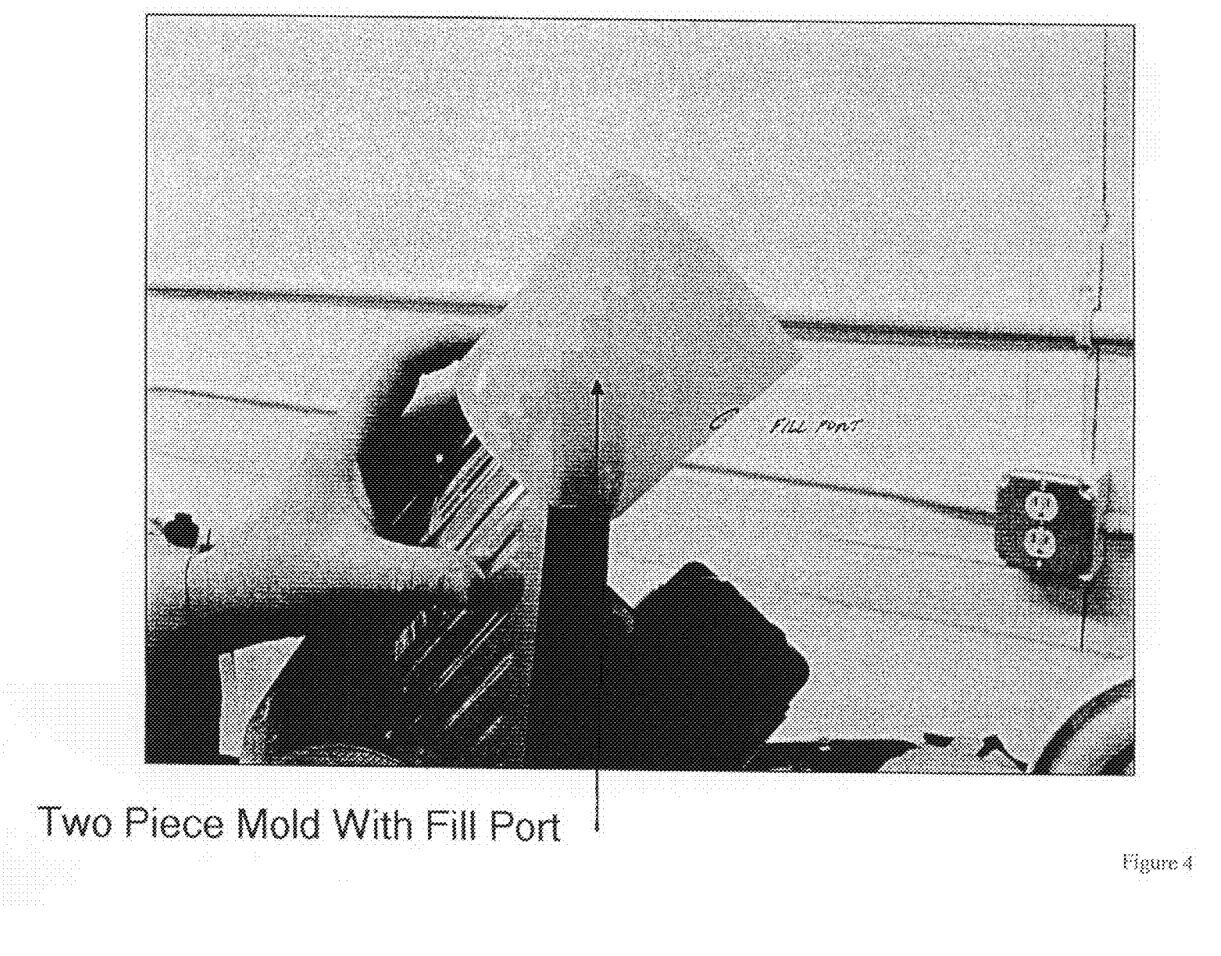
FIG. 4 is a perspective representation of a two piece mold in accordance with the present invention.
Figure 5:
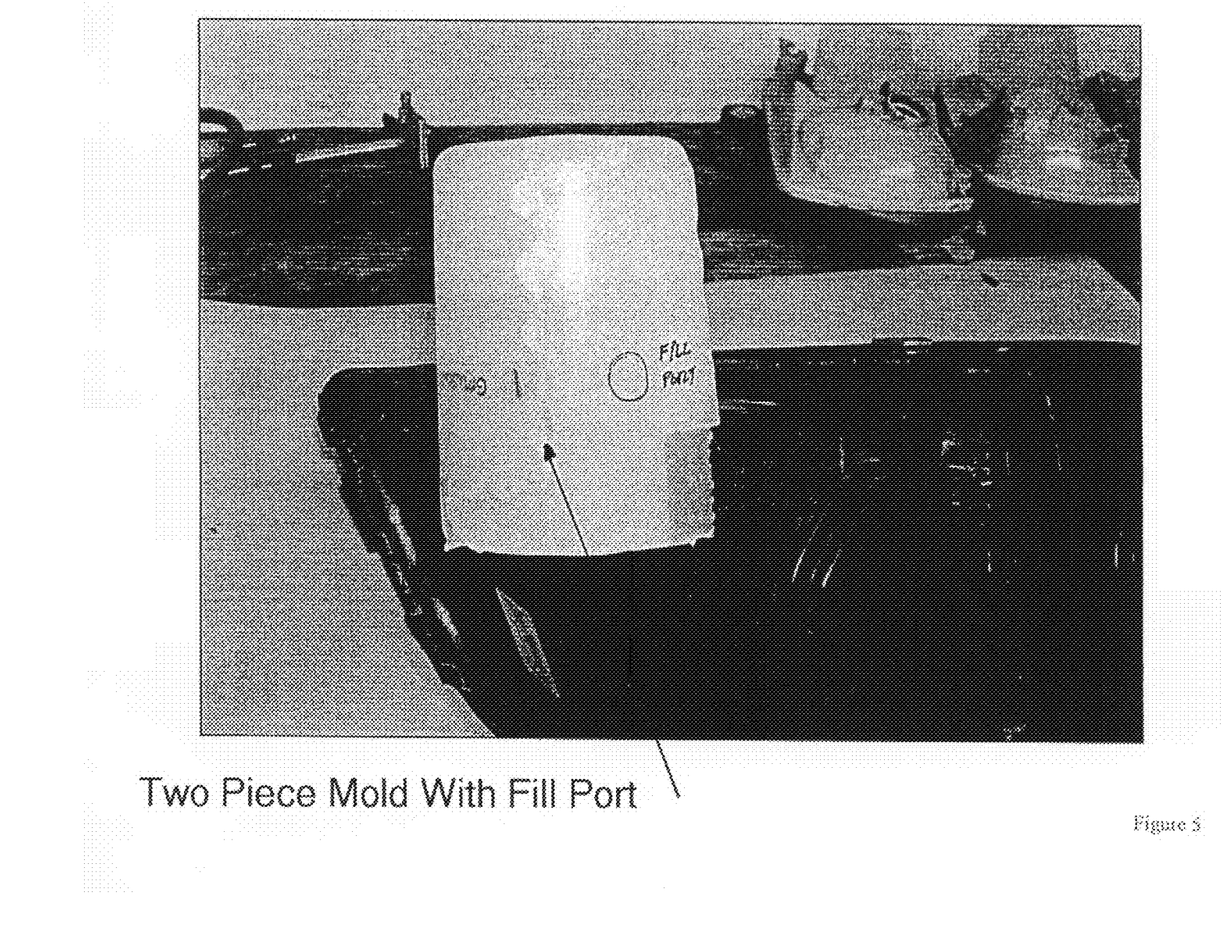
FIG. 5 is a perspective representation of a two piece mold in accordance with the present invention.
Figure 6:
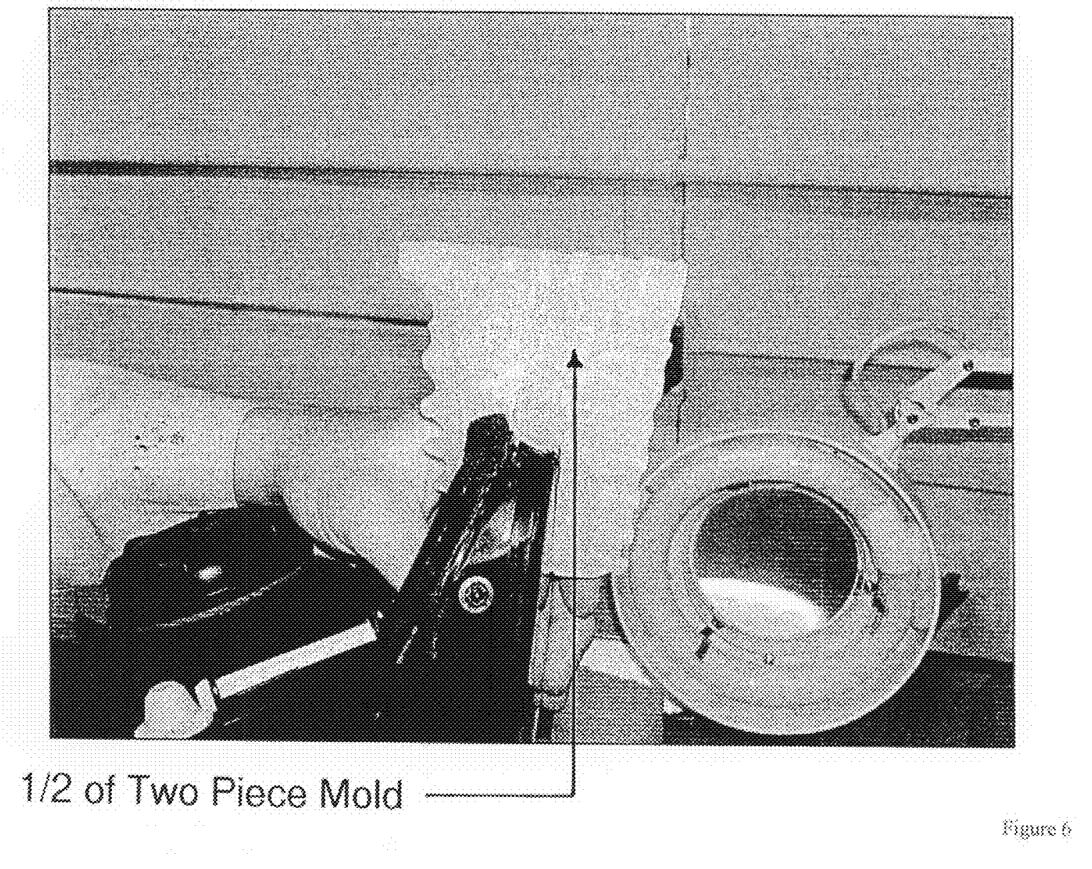
FIG. 6 is a perspective representation of a portion of a two piece mold in accordance with the present invention.
Figure 7:
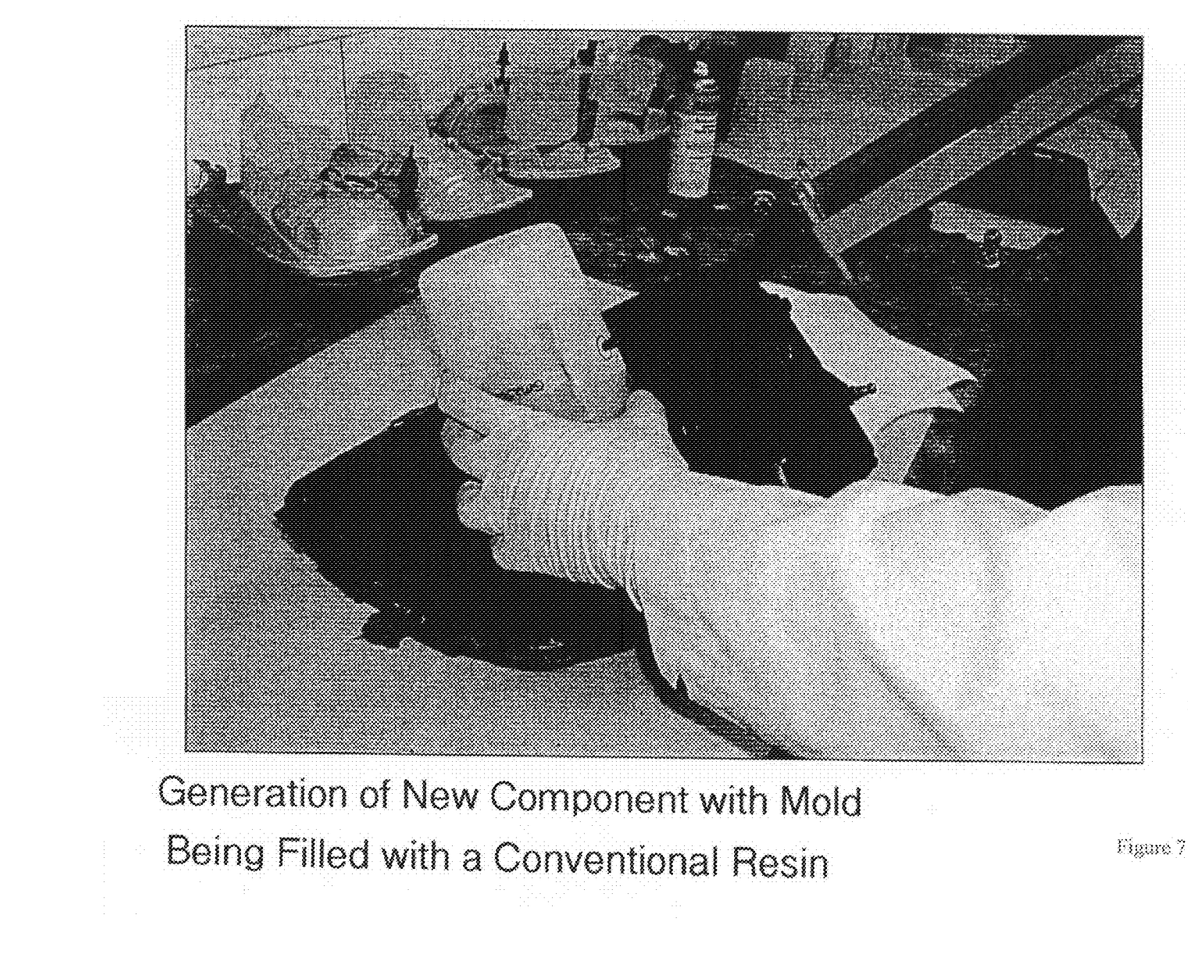
FIG. 7 is a perspective representation of new component of a vehicular light assembly in accordance with the present invention.
Figure 8:
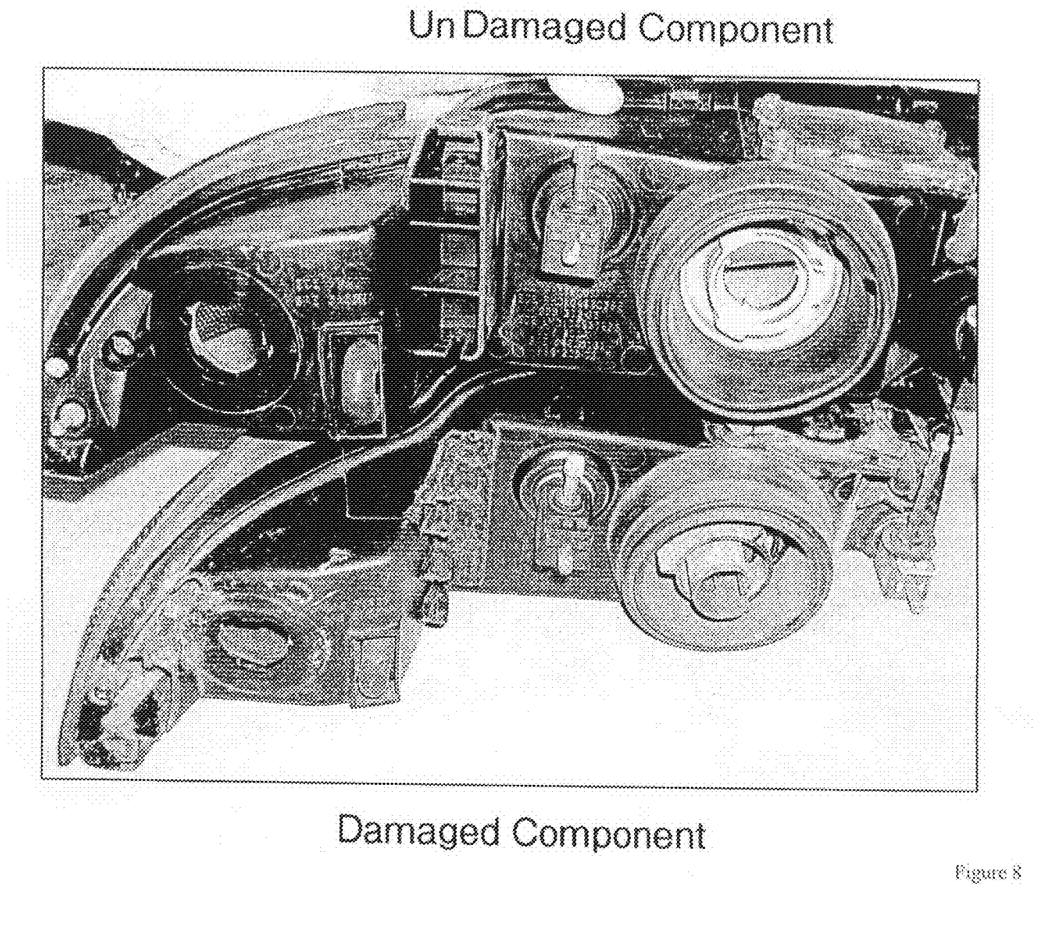
FIG. 8 is a comparative perspective representation of undamaged and damaged vehicular light assemblies in accordance with the present invention.

A method for repairing a vehicular light assembly is also disclosed which comprises the following steps: (a) providing a vehicular light assembly having at least one damaged sub-component, such as a tab, slot, etcetera (FIGS. 1-3); (b) providing a mold from at least one of a vehicular light assembly and vehicular light assembly sub-component void of damage relative to the at least one damaged sub-component—preferably the mold is a silicone mold (FIGS. 4-6); and (c) generating a new sub-component from the mold to, in turn, repair the at least-one damaged sub-component (FIG. 7). A new sub-component may be generated with or without preparing the area of the damaged sub-component, such as grinding down the damaged sub-component and/or applying an adhesion promoter to the same. Typically the mold is filled with, for example, a liquid urethane based resin which cures within approximately less than 24 hours.

It will be understood that additional steps may include: (a) cleaning the vehicular light assembly, such as by conventional wet and/or dry cleaning methods; (b) sanding a lens cover of the vehicular light assembly, which may include dry sanding (80-1000 grit/mesh paper) as well as wet sanding (1000-4000 micro-mesh paper); (c) buffing a lens cover of the vehicular light assembly using conventional buffing compounds; (d) annealing the vehicular light assembly with, for example, an IR light source and/or other heat source; and (e) curing a lens cover of the vehicular light assembly, optionally wherein the vehicular light assembly is fully fabricated and includes, for example, a housing (fabricated from, for example, ABS, ABS-PC blend), a reflector, a bulb, and/or a lens cover (fabricated from, for example, PC). It will be understood that curing the lens cover may include flashing the entire vehicular light assembly at a temperature of between approximately 120 and approximately 250 degrees Fahrenheit (more preferably approximately 160 degrees Fahrenheit) prior to, or concurrent with exposure to a UV-light source.

The following patents/publications are hereby incorporated herein by reference in their entirety, including the references cited therein, namely: U.S. Pat. Nos. D520,157; 4,325,105; 4,924,359; 4,922,388; 7,052,165; 4,967,319; 4,967,318; and U.S. Pat. Pub. No. 2007/0141242 A1.

The foregoing description merely explains and illustrates the invention and the invention is not limited thereto except insofar as the appended claims are so limited, as those skilled in the art who have the disclosure before them will be able to make modifications without departing the scope of the invention.

What is claimed is:

1. A method for repairing a vehicular light assembly, comprising the steps of:
   providing a vehicular light assembly having at least one damaged sub-component;
   providing a mold from at least one of a vehicular light assembly and vehicular light assembly sub-component void of damage relative to the at least one damaged sub-component; and
   generating a new sub-component from the mold to, in turn, repair the at least-one damaged sub-component.

2. The method according to claim 1, further comprising the step of cleaning the vehicular light assembly.

3. The method according to claim 1, further comprising the step of sanding a lens cover of the vehicular light assembly.

4. The method according to claim 1, further comprising the step of buffing a lens cover of the vehicular light assembly.

5. The method according to claim 1, further comprising the step of annealing the vehicular light assembly.

6. The method according to claim 1, further comprising the step of curing a lens cover of the vehicular light assembly, wherein the vehicular light assembly is fully fabricated.

7. The method according to claim 6, wherein the fully fabricated vehicular light assembly comprises a housing, a reflector, a bulb, and a lens cover.

8. A method for repairing a vehicular light assembly, consisting of the steps of:
   providing a vehicular light assembly having at least one damaged sub-component;
   providing a mold from at least one of a vehicular light assembly and vehicular light assembly sub-component void of damage relative to the at least one damaged sub-component; and
   generating a new sub-component from the mold to, in turn, repair the at least one damaged sub-component.

* * * * *